Figure 1:
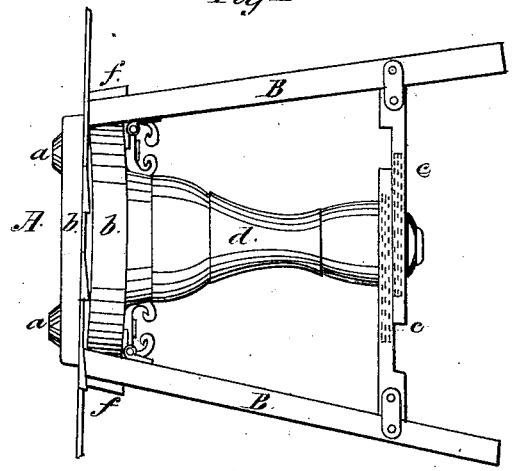
Figure 2:
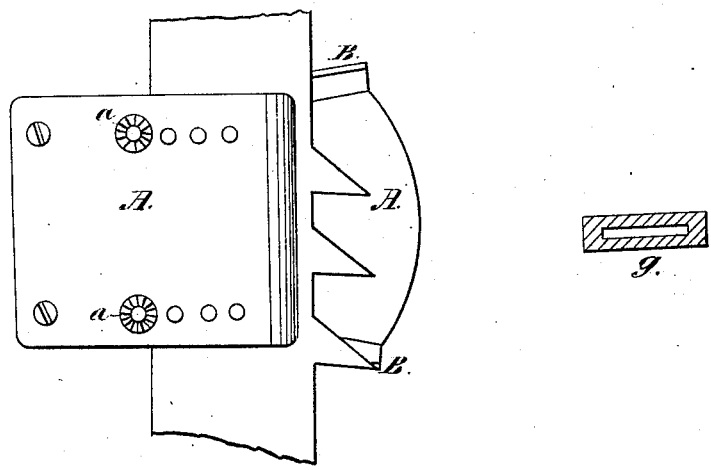

E. Stubbs,
Sharpening Reciprocating Saws.
Nº 61,277.    Patented Jan. 15, 1867.

Witnesses:
J. G. Clark
A. L. Peck

Inventor:
Eli Stubbs
By his Atty
H. P. K. Peck

United States Patent Office.

ELI STUBBS, OF WEST ELKTON, OHIO.

*Letters Patent No. 61,277, dated January 15, 1867.*

IMPROVEMENT IN MACHINES FOR FILING SAWS.

*The Schedule referred to in these Letters Patent and making part of the same.*

TO ALL WHOM IT MAY CONCERN:

Be it known that I, ELI STUBBS, of West Elkton, in Preble county, in the State of Ohio, have invented a new and useful Improvement in Saw-Filing Machines; and I do hereby declare that the following is a full and exact description thereof, reference being had to the accompanying drawings, and to the letters of reference marked thereon.

Figure I represents a side elevation of my invention.

Figure II represents the front of the same, with the saw or a section thereof secured thereon.

The object of my invention is to furnish a simple machine which will enable any person to file a saw with the greatest accuracy and uniformity: and my invention consists in the construction, arrangement, and combination of an adjustable clamp, with two adjustable guides for the file, to be applied and used as will be herein fully set forth.

In the accompanying drawings, A denotes the saw-clamp, which is capable of being adjusted to hold the saw, or so that the machine will be retained in place upon the saw while the latter is hung in its bearings in the sash of a saw-mill. The clamp A is so constructed that the saw will be held with its back against the two set-screws $a\ a$, and that portion along the line of the saw-teeth will be held by the two jaws $b\ b$, of the clamp A. The rear jaw of the saw-clamp extends beyond the front jaw, and extending back therefrom are two file-guides, B B, hinged to the rear jaw, as represented in the drawings. These guides may be of a width equal to the width of an ordinary saw-file. The faces of these saw-guides stand at an angle to a horizontal line, so as to correspond with the angle formed by the saw-teeth. The guides are connected together by sliding adjustable arms, $c\ c$, which are furnished with slots, through which a set-screw passes in order to secure them, at any desired adjustment or position, to the bracket $d$, which is firmly fastened to the back of the rear jaw, as seen in the drawings. This adjustment will govern the angle at which the tooth will be filed. The flat blocks $f$, fastened upon the side of each of the guides at the front ends thereof, serve as gauges for the file. And a gauge-block on the end of the file corresponds in thickness with the gauge-blocks $f$. The series of holes through the clamp are for the purpose of inserting the set-screws $a\ a$ in position to correspond with the width of the saw to be filed, and one of these screws $a\ a$ is in a vertical line above the other. In other words, the set-screws serve to govern the position of the saw-teeth, and bring one of their edges in line with the face of the gauge-block $f$.

To use my machine, the clamp A is applied to the saw as represented in the drawings, and is retained in place by its friction upon the saw while a tooth is filed, when the machine is moved along (without adjusting the set-screws for the purpose, this having been done in first applying it to the saw,) by hand to bring the next tooth to be filed in position. When the saw-teeth are thus filed upon one edge, the machine is reversed in position upon the saw to file the other edge or angle of the teeth. In filing the saw, the block slotted to receive the end of the file, and designated by the letter $g$, being of the same thickness on each side of the file, to correspond with the gauge-blocks $f$, will cause the file to move back and forth, when operated by the person filing, in a straight line and uniformly do its work. The file-guides will be adjusted to the desired angle before commencing the work, as they will govern the angle at which the teeth are to be filed. By the use of my invention saws used in saw-mills, whether hung in sash or otherwise, may be readily and properly filed by a person not practically experienced in this kind of work. It is well known that, without the aid of some mechanical means of governing the reciprocating action of the file, no one not fully experienced in the work can perform it efficiently.

Having now fully described my improvement in saw-filing machines, what I claim therein, and desire to secure by Letters Patent, is—

The adjustable clamp A, in combination with the hinged adjustable guides B B, constructed and arranged as described, as a new article of manufacture, applied and used in the manner specified.

In testimony whereof I have hereunto set my hand this 1st day of October, 1866.

ELI STUBBS.

Witnesses:
H. P. K. PECK,
JOHN P. P. PECK.